July 21, 1942. R. O. BENDER Re. 22,137
REFINING OF OIL
Original Filed Oct. 20, 1939
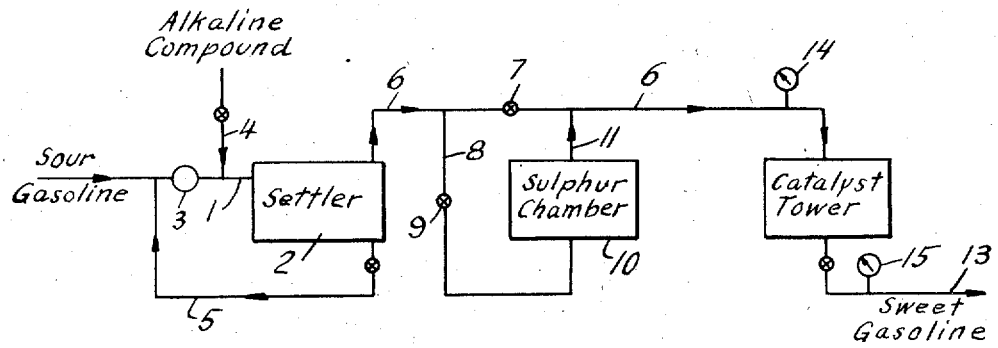
INVENTOR
Richard O. Bender
BY
Pennie, Davis, Marvin & Edmonds
ATTORNEYS Reissued July 21, 1942

Re. 22,137

UNITED STATES PATENT OFFICE 22,137

REFINING OF OIL

Richard O. Bender, Ridley Park, Pa., assignor to Sinclair Refining Company, New York, N. Y., a corporation of Maine Original No. 2,272,594, dated February 10, 1942, Serial No. 300,439, October 20, 1939. Application for reissue May 11, 1942, Serial No. 443,177

12 Claims. (Cl. 196—30)

This invention relates to the refining of petroleum oils and, more particularly, to the refining of light petroleum distillates. The invention includes a novel process for removing undesirable sulphur compounds from such light distillates and also a novel catalyst preeminently adapted to accomplish this result.

Light petroleum distillates contain undesirable sulphur compounds such, for example, as mercaptans which impart to the distillates an objectionable odor and corrosiveness. These distillates, containing undesirable sulphur compounds and known as "sour" distillates, have been the object of a multitude of processes for the purpose of removing undesirable sulphur compounds from the distillates, an operation known as "sweetening." Treatment of sour distillates with sodium plumbite, the so-called "doctor" treatment, has been generally adopted in the art as the most efficient method of sweetening such distillates. The "doctor" treatment, however, requires the use of large volumes of aqueous treating solutions with attendant high losses of distillate and of expensive treating solutions due to the formation of emulsions and to incomplete washing of treating solution from treated distillate. Moreover, the handling of large volumes of such aqueous solutions requires a large labor force and further presents a serious problem during cold weather, and this problem has been characteristic of other sweetening operations employing large volumes of aqueous solutions.

More recently there have been attempts to sweeten sour distillates by processes which propose to avoid handling of substantial amounts of aqueous solutions, these processes being known as "dry" sweetening. Lead sulphide has been used heretofore as a catalyst in such dry sweetening processes utilizing elemental sulphur and free oxygen to remove the undesirable sulphur compounds from the distillates, but the methods hereinbefore attempted have been less efficient than the conventional doctor treatment and have been further characterized, as is the conventional doctor treatment, by a loss of anti-knock value, indicated for example by a decrease of at least one-half point in the octane number, of gasoline so treated.

I have devised a novel dry process for sweetening light petroleum distillates containing undesirable sulphur compounds. This process is as effective as the conventional doctor sweetening without the disadvantages inherent in doctor sweetening and, furthermore, does not reduce the anti-knock value of distillates, such as gasoline.

I have found that undesirable sulphur compounds contained in light petroleum distillates may be removed effectively and economically by incorporating in such a distillate elemental sulphur and an amount of an alkaline compound sufficient to render the distillate alkaline, and by then subjecting the alkaline distillate containing elemental sulphur to the action of a lead sulphide catalyst. My invention includes a process for removing undesirable sulphur compounds from such distillates in which the distillate, rendered alkaline and containing an amount of elemental sulphur substantially in excess of that required theoreticaly to combine with said sulphur compounds, is passed in contact with a mass of lead oxide so as to convert the lead oxide to lead sulphide, and the amount of sulphur contained in the alkaline distillate passing in contact with the lead sulphide is then reduced to substantially that amount required theoretically to combine with said sulphur compounds in the distillate. I have discovered, furthermore, that contact between the distillate and the lead sulphide catalyst can, and should, be effected in the absence of any substantial amount of free oxygen, and that the distillate should be substantially free from entrained moisture before being subjected to the action of the catlyst. The amount of elemental sulphur incorporated in the distillate should be substantially that amount of sulphur required theoretically to combine with the undesirable sulphur compounds contained in the distillate. I have found that an amount of sulphur substantially greater than that theoretically required, and hereinafter referred to as "excess" sulphur, poisons the catalyst and should be avoided. The amount of alkaline compound incorporated in the distillate should be sufficient to provide an excess alkalinity such that the sweetened distillate is slightly alkaline after contact with the catalyst.

My novel dry sweetening process, while applicable broadly to light petroleum distillates such for example as kerosene and gasoline, is particularly adapted for the treatment of gasolines. The process of my invention is effective in the treatment of straight-run gasoline as well as cracked gasoline, cracked gasolines requiring a somewhat longer period of treatment, or a slower throughput in the catalyst vessel than straight-run gasolines. I will, therefore, hereinafter describe the process of my invention as applied specifically to the treatment of gasoline.

The amount of sulphur required for the treatment of gasoline in accordance with my invention depends primarily upon the amount of undesirable sulphur compounds contained in the particular gasoline under treatment. Inasmuch as the mercaptans comprise the most important sulphur compounds to be eliminated from gasolines, the mercaptan content of a gasoline serves as an index of the amount of sulphur required in my process. Thus, the amount of sulphur which should be used in each instance will be that required to combine with the mercaptans contained in the gasoline for the conversion of these mercaptans to the corresponding disulphides. This theoretical amount of sulphur required may be readily ascertained by conventional analysis. A substantial excess of elemental sulphur is undesirable either in the sweetening operation or in the finished gasoline. The prolonged use of excess sulphur materially shortens the life of the lead sulphide catalyst, and the use of excess sulphur decreases the anti-knock value of the gasoline under treatment. I have found, however, that the sensitivity of the catalyst to variations in the sulphur content and alkalinity of the sour gasoline diminishes with an increase in the size of the catalyst vessel used in accordance with my invention.

The alkalinity of the gasoline subjected to the action of the catalyst should be controlled so that a slight excess is always available. By excess alkalinity I mean that the sweetened gasoline after treatment with the catalyst should be slightly alkaline, thus assuring the presence of a sufficient amount of alkaline compound for the catalyst treatment. For example, about 6–7 pounds of NaOH per thousand barrels of gasoline is satisfactory in the treatment of a heavy straight-run gasoline. About 12 pounds of NaOH per thousand barrels is required for the treatment of light depropanized straight-run gasoline flashed from crude oil at 340° F. and 40 pounds pressure. I have found that about 20 pounds of NaOH per thousand barrels may be used with advantage for the treatment of reformed straight-run gasoline. Alkalinity may be imparted to the gasoline by ammonia instead of NaOH, ammonia having the advantage of providing greater facility and flexibility in the control of the alkalinity of the gasoline. The use of ammonia is particularly advantageous in the treatment of cracked gasolines. Moreover, the desired alkalinity may be imparted to a gasoline wholly or in part by a preliminary lye washing operation in accordance with conventional refinery practice. Excessive alkalinity reduces the activity of the catalyst by rendering it readily susceptible to wetting by moisture entrained in the gasoline, and wetting of the catalyst with entrained moisture prevents proper contact between catalyst and gasoline. Deficient alkalinity causes the catalyst to become poisoned thus requiring more frequent reactivation of the catalyst. I have found, however, that a lead sulphide catalyst poisoned in this manner may be reactivated by pouring aqueous ammonia over the catalyst and then allowing it to stand for several hours before re-use.

I have found that lead sulphide deposited on sawdust is an excellent catalyst which may be used with particular advantage although good results may also be obtained with a catalyst comprising lead sulphide deposited on carborundum, bone black or animal charcoal. A sawdust carrier which I have found to be particularly advantageous comprises sawdust classified to pass through a 10-mesh screen but sufficiently coarse not to pass through a 20-mesh screen. This carrier provides a large contact surface with attendant high catalytic efficiency. Furthermore, the sawdust carrier does not tend to pack into a comparatively impervious bed, but remains porous throughout the active life of the catalyst. The lead sulphide may be deposited on the sawdust carrier by admixing sawdust, wet with gasoline, with litharge (PbO) in such proportion that the litharge comprises about 35%–70%, or as now preferred, about 40%–50%, by weight of the mixture, then passing through a bed of this mixture in a suitable tower a charge of alkaline gasoline containing a substantial excess of elemental sulphur until the litharge is largely converted to lead sulphide as evidenced by the progressively increased sweetening of gasoline discharged from the bed. The catalyst thus produced, comprising lead sulphide deposited on sawdust and containing about 30%–70% lead sulphide by weight, or about 35%–40% lead sulphide when starting with a mixture containing 40%–50% lead oxide, may then be used in the normal sweetening operation in which the use of excess sulphur in the gasoline charge is avoided. I have found, however, that the catalyst thus prepared does not remain active for a very long period but that after initial reactivation it is in condition to be used over long periods of activity between successive reactivations. Reactivation of spent catalyst may be effected by steaming the bed of catalyst for several hours, then washing the catalyst with water until substantially free from alkalinity, removing and drying the catalyst, and subsequently replacing the catalyst in the catalyst tower. Increased reactivation of the catalyst may be provided by washing the replaced catalyst with acetone and displacing the acetone with gasoline so as to moisten the body of catalyst with the gasoline. Although washing of the catalyst with acetone is not vital to successful operation of my sweetening process, it nevertheless increases by 20%–25% in many instances the active period of the catalyst between successive reactivations. I have found that wetting of the sawdust, in admixture with litharge or with lead sulphide (in the case of reactivated catalyst), with gasoline reduces packing of the sawdust carrier during subsequent normal operation.

The presence of excessive quantities of entrained moisture should be avoided in the alkaline gasoline charged to the catalyst bed. The amount of entrained moisture in the gasoline to be treated by my sweetening process depends largely upon the source of the gasoline and its treatment prior to sweetening by my process. The amount of moisture ordinarily entrained in sour gasoline is not detrimental to my process. However, treatment of this gasoline with caustic solution or with aqueous ammonia introduces into the gasoline an excessive amount of water which should not be carried over into the catalyst bed, and for this reason adequate means should be provided for separation of such water from the alkaline gasoline before it is charged to the catalyst. The presence of an excessive quantity of entrained moisture in the alkaline gasoline charged to the catalyst selectively wets the lead sulphide thus preventing efficient contact between catalyst and gasoline. Moreover, excessive moisture also wets a sawdust carrier causing such sawdust to pack and thus to impede the flow of gasoline through the catalyst bed. Packing of the catalyst bed may be readily detected by a marked increase in the pressure drop through the catalyst bed.

I have also found that the presence of any substantial amount of free oxygen is undesirable in catalytic sweetening in accordance with my invention. Thus, deliberate introduction of air, or the like, into the alkaline gasoline charged to the catalyst bed should be avoided. The presence of adventitious air does not appreciably affect normal operation in accordance with my invention. The presence of an appreciable quantity of air in the gasoline tends to oxidize the lead sulphide catalyst thus requiring the use of excess sulphur in the gasoline to maintain the catalyst in the desired form of lead sulphide. The use of excess sulphur is undesirable, as noted hereinbefore, not only because of its detrimental effect on the catalyst but also because it effects a reduction in the anti-knock value of the gasoline under treatment.

The effectiveness of this sweetening is not appreciably affected by variations in temperature and pressure. The sweetening operation may be carried out with advantage at ordinary temperature and pressure although some improvement has been noted with the use of elevated temperatures. The maximum rate of charging alkaline gasoline to the catalyst tower can be readily determined by varying the charging rate under normal operating conditions. The charging rate is directly affected by the amount of undesirable sulphur compounds contained in the gasoline. Increased size of the catalyst tower greatly increases the maximum charging rate. I have found, however, that prolonged operation with a charging rate to the catalyst tower substantially in excess of that which will effect proper sweetening of the gasoline will soon poison the catalyst. The existence of this condition is indicated during normal operation by a rapid falling off of the maximum sweetening rate.

The operation of my novel dry sweetening process may be illustrated by reference to the accompanying drawing. Sour gasoline containing undesirable sulphur compounds and obtained from storage is introduced through line 1 into a settler 2 by means of a suitable pump 3. The pump may be eliminated when the sour gasoline is delivered to line 1 under any sufficient refinery pressure. A controlled amount of alkaline compound such, for example, as a solution of caustic soda, or dry or aqueous ammonia, or a mixture of both, is introduced into line 1 through line 4. The introduction of the mixture of alkaline compound and sour gasoline into settler 2 permits separation of excess alkaline compound and entrained water from the gasoline, and such material settling from the gasoline may be returned advantageously through line 5 for reintroduction into line 1. The alkaline gasoline is removed from the top of the settler through line 6 provided with a back pressure valve 7. At least a portion of the alkaline gasoline is bypassed around valve 7 through line 8 and sulphur control valve 9 into a chamber 10 containing elemental sulphur, and alkaline gasoline containing dissolved sulphur is removed from the top of chamber 10 through line 11 for reintroduction into line 6. The resulting alkaline gasoline containing elemental sulphur is then passed to the top of catalyst tower 12 where the gasoline charge is subjected to contact with the catalyst. Sweetened gasoline is removed from the lower portion of the tower through line 13. The amount of sulphur incorporated in the alkaline gasoline charged to the catalyst tower may be controlled by regulating the portion of alkaline gasoline by-passed through line 8 and the sulphur chamber 10. The apparatus may be further provided with suitable pressure gauges 14 and 15 adapted to indicate the pressure drop through the catalyst bed in tower 12, a large pressure drop indicating that excess moisture has caused undue packing of the catalyst.

A further understanding of the process of my invention may be had from the following specific examples in tabulated form involving the treatment of a light, a heavy, and a reformed gasoline, respectively, in accordance with the process of my invention. The light gasoline treated in these examples was flashed from crude oil at 340° F. and 40 lbs. pressure and was subsequently depropanized in a tower where it was stripped under 200 lbs. pressure in the depropanizer tower with a reboiler temperature of 310–315° F. to produce a gasoline having a Reid vapor pressure of about 14–15 lbs. The heavy gasoline was also obtained from a crude oil still and was lye-washed before being charged to my treating operation. The reformed gasoline was obtained from a reforming still, was then debutanized, and was subsequently passed directly to the treating process of my invention. The following tabulated data comprise the results from five runs on each of these gasolines using a catalyst tower having a capacity of about 9 cubic feet. The catalyst in each run comprises a sawdust-lead sulphide mixture prepared as described above and containing about 30%–60% lead sulphide in its active condition. Acetone was used as above described for washing the catalyst during reactivation of the catalyst between runs, and the introduction of air into the treating operations was avoided as far as possible.

| Gasoline | Light gasoline | Heavy gasoline | Reformed gasoline |
|---|---|---|---|
| Total bbls. gasoline treated | 238,507 | 298,816 | 75,121 |
| Total cubic foot catalyst | 47.5 | 34.91 | 23.81 |
| Total hours on stream | 2,486 | 3,098 | 1,505 |
| Total sulphur used ... pounds | 717 | 1,307 | 512 |
| Average length of run ... hours | 497 | 619 | 301 |
| Average bbls. gasoline per cu. ft. of catalyst | 5,030 | 8,560 | 3,155 |
| Average bbls. gasoline per run | 47,700 | 59,763 | 15,024 |
| Average cu. ft. catalyst per run | 9.5 | 6.98 | 4.72 |
| Lbs. sulphur per 1,000 bbls | 3.0 | 4.37 | 6.80 |
| Lbs. NaOH per 1,000 bbls | 12.15 | 6.57 | 20.25 |
| Lbs. $NH_3$ per 1,000 bbls | 1.35 | ---------- | 0.164 |
| Lbs. acetone wash per run | 700 | 700 | 350 |

The treated gasolines were completely sweetened, shown by the standard "doctor" test, and were non-corrosive as indicated by the standard "copper-strip" test.

Although lead sulphide is a particularly advantageous catalyst in the process of my invention, the sulphides of the polyvalent metals are generally useful as catalysts in the process. For example, mercuric sulphide, bismuth sulphide, arsenic sulphide, cupric sulphide, nickel sulphide and manganese sulphide can be used in place of lead sulphide in the sweetening process of my invention as previously described.

It will be seen, therefore, that the process of my invention provides efficient and economical sweetening of gasoline by the so-called "dry" process. The cost of treating gasoline and other light distillates by the process of my invention is only a small fraction of the cost of treating such distillates by the conventional doctor treatment.

The high emulsion and washing losses concomitant with conventional doctor treatment are eliminated and the required operating labor is material reduced. My process also eliminates the necessity of handling large volumes of aqueous solution which are particularly difficult to handle during cold weather as found by common experience in heretofore conventional practices.

I claim:

1. The method of removing undesirable sulphur compounds from a light petroleum distillate which comprises incorporating in the distillate elemental sulphur and an amount of an alkaline compound sufficient to render and maintain the distillate alkaline, and subjecting the alkaline distillate containing elemental sulphur to the action of a lead sulphide catalyst in the absence of any substantial amount of free oxygen and any substantial amount of moisture.

2. The method of removing undesirable sulphur compounds from a light petroleum distillate which comprises incorporating in the distillate an amount of elemental sulphur substantially equal to the amount of sulphur required to combine with said sulphur compounds and also incorporating in the distillate an amount of an alkaline compound sufficient to render and maintain the distillate alkaline, and subjecting the alkaline distillate containing elemental sulphur to the action of a lead sulphide catalyst in the absence of any substantial amount of moisture.

3. The method of removing undesirable sulphur compounds from a light petroleum distillate which comprises incorporating in the distillate an amount of elemental sulphur substantially equal to the amount of sulphur required to combine with said sulphur compounds and also incorporating in the distillate an amount of an alkaline compound sufficient to render and maintain the distillate alkaline, and subjecting the alkaline distillate containing elemental sulphur to the action of a lead sulphide catalyst in the absence of any substantial amount of free oxygen and any substantial amount of moisture.

4. The method of removing undesirable sulphur compounds from a light petroleum distillate which comprises incorporating in the distillate elemental sulphur and an amount of an alkaline compound sufficient to render and maintain the distillate alkaline, and subjecting the alkaline distillate containing elemental sulphur in the absence of any substantial amount of moisture to the action of a catalyst comprising lead sulphide deposited on a carrier.

5. The method of removing undesirable sulphur compounds from a light petroleum distillate which comprises incorporating in the distillate element sulphur and an amount of an alkaline compound sufficient to render and maintain the distillate alkaline, and subjecting the alkaline distillate containing elemental sulphur in the absence of any substantial amount of moisture to the action of lead sulphide deposited on sawdust.

6. The method of removing undesirable sulphur compounds from a light petroleum distillate which comprises incorporating in the distillate elemental sulphur and an amount of an alkaline compound sufficient to render and maintain the distillate alkaline, and subjecting the alkaline distillate containing elemental sulphur while substantially free from entrained moisture to the action of a lead sulphide catalyst.

7. The method of removing undesirable sulphur compounds from a light petroleum distillate which comprises passing the distillate rendered alkaline and containing an amount of elemental sulphur substantially in excess of that required theoretically to combine with said sulphur compounds and in the absence of any substantial amount of moisture in contact with lead oxide so as to convert the lead oxide to lead sulphide, and then reducing the amount of sulphur contained in the alkaline distillate passing in contact with the lead sulphide to substantially that amount required theoretically to combine with said sulphur compounds in the distillate.

8. The method of removing undesirable sulphur compounds from a light petroleum distillate which comprises passing a distillate rendered alkaline and containing an amount of elemental sulphur substantially in excess of that required theoretically to combine with said sulphur compounds and in the absence of any substantial amount of moisture in contact with lead oxide admixed with sawdust previously wetted with the distillate so as to convert the lead oxide to lead sulphide, and then reducing the amount of sulphur contained in the alkaline distillate passing in contact with the lead sulphide to substantially that amount required theoretically to combine with said sulphur compounds in the distillate.

9. The method of removing undesirable sulphur compounds from gasoline which comprises incorporating in the gasoline elemental sulphur and an amount of an alkaline compound sufficient to render and maintain the gasoline alkaline, and subjecting the alkaline gasoline containing elemental sulphur to the action of a lead sulphide catalyst in the absence of any substantial amount of free oxygen and any substantial amount of moisture.

10. The method of removing undesirable sulphur compounds from a light petroleum distillate which comprises incorporating in the distillate elemental sulphur and an amount of an alkaline compound sufficient to render the distillate alkaline, and subjecting the alkaline distillate containing elemental sulphur while substantially free from entrained moisture to the action of a polyvalent lead sulphide catalyst.

11. The method of eliminating undesirable sulphur compounds from a light petroleum distillate consisting of incorporating in the distillate an amount of elemental sulphur substantially equal to the amount required to combine with the sulphur compounds and sodium hydroxide in an amount sufficient to render and maintain the distillate alkaline, and subjecting the alkaline distillate containing elemental sulphur to the action of a lead sulphide catalyst in the absence of any substantial amount of free oxygen and any substantial amount of moisture.

12. The method of eliminating undesirable sulphur compounds from a light petroleum distillate consisting of incorporating in the distillate an amount of elemental sulphur substantially equal to the amount required to combine with the sulphur compounds and ammonia in an amount sufficient to render and maintain the distillate alkaline, and subjecting the alkaline distillate containing elemental sulphur to the action of a lead sulphide catalyst in the absence of any substantial amount of free oxygen and any substantial amount of moisture.

RICHARD O. BENDER.